(12) United States Patent
Daugherty et al.

(10) Patent No.: US 7,942,773 B2
(45) Date of Patent: May 17, 2011

(54) BANDED POWER TRANSMISSION V-BELT

(75) Inventors: Jerome M. Daugherty, Littleton, CO (US); Mitchell Reedy, Springdale, AR (US); William Buchholz, Springdale, AR (US)

(73) Assignee: The Gates Corporation IP Law Dept., Denver, CO (US)

( * ) Notice: Subject to any disclaimer, the term of this patent is extended or adjusted under 35 U.S.C. 154(b) by 1326 days.

(21) Appl. No.: 11/167,779

(22) Filed: Jun. 27, 2005

(65) Prior Publication Data

US 2006/0293140 A1 Dec. 28, 2006

(51) Int. Cl.
*F16G 5/00* (2006.01)
*F16G 1/00* (2006.01)
*B29D 17/00* (2006.01)

(52) U.S. Cl. .................. 474/265; 474/261; 156/137

(58) Field of Classification Search .......... 474/260–264, 474/265; 156/137
See application file for complete search history.

(56) References Cited

U.S. PATENT DOCUMENTS

| | | | |
|---|---|---|---|
| 2,392,373 A | 4/1941 | Freedlander | 74/234 |
| 2,414,822 A | 6/1943 | Lindsay et al. | 74/233 |
| 2,554,917 A | 10/1945 | Moon | 74/233 |
| 2,519,590 A | 8/1950 | Mitchell | 74/233 |
| 3,563,103 A | 2/1971 | Sauer | 74/233 |
| 3,667,308 A * | 6/1972 | Schwab et al. | 474/263 |
| 3,847,029 A * | 11/1974 | Ray | 474/265 |
| 3,863,515 A * | 2/1975 | Meadows | 474/262 |
| 3,996,813 A * | 12/1976 | Henderson et al. | 474/238 |
| 4,095,480 A * | 6/1978 | Schwabauer | 474/265 |
| 4,244,234 A | 1/1981 | Standley | 474/263 |
| 5,173,361 A * | 12/1992 | Yamashita et al. | 428/298.1 |
| 7,056,249 B1 * | 6/2006 | Osako et al. | 474/260 |
| 2005/0245340 A1 * | 11/2005 | Ballhausen et al. | 474/266 |

FOREIGN PATENT DOCUMENTS

| | | |
|---|---|---|
| DE | 943 023 C | 5/1956 |
| DE | 10203015 A1 * | 8/2003 |
| FR | 1 096 305 A | 6/1955 |
| JP | 59 217034 A | 12/1984 |

OTHER PUBLICATIONS

Resorcinol Adhesive Chemistry, from www.chemical-supermarket.com.*
Gates Corporation, Predator Belt Drive Sytem, Jun. 2008, Gates Corporation Sales Brochure.*
Interntional Preliminary Report on Patentability; Written Opinion of the International Searching Authority; Jan. 17, 2008; PCT/US2006/025061.
Photograph and description of commercial belt PREDATOR 5VP1060, Gates Corporation (See attached Exhibit A).

* cited by examiner

*Primary Examiner* — Michael R Mansen
*Assistant Examiner* — Robert T Reese
(74) *Attorney, Agent, or Firm* — P. M. Dunlap, Esq.; J. A. Thurnau, Esq.; T. A. Dougherty, Esq.

(57) ABSTRACT

A single strand banded V-belt is described featuring at least one ply of a band fabric which traverses the bottom surface and each of the side surfaces of the belt body so as to cover the load-carrying section at the position that it intercepts the side surfaces of the belt body. The ply of band fabric does not overlap with itself. The total sum of the number of plies of band fabric positioned on both side surfaces of the belt body exceed the total sum of the number of plies of band fabric positioned on the top plus bottom surfaces of the belt body.

18 Claims, 2 Drawing Sheets

BANDED POWER TRANSMISSION V-BELT

BACKGROUND OF THE INVENTION

1. Field of the Invention

This invention relates to rubber power transmission belts of the V-type, and particularly to a rubber V-belt having one or more plies of a fabric band covering the exterior driving surfaces of the belt.

2. Description of Related Art

Covered or banded power transmission V-belts are normally constructed with an outer layer of rubber or other polymer impregnated fabric surrounding the belt core. The cover provides a number of functions, including protecting the belt from environmental elements, controlling the frictional characteristics of the belt, and resisting wear of the belt as it contacts the sheaves (pulleys) in a V-belt drive. These "full cover" V-belts are typically manufactured so that one edge of the outer layer of fabric laps over the other edge. This lap runs the entire length of the belt. Some belts have multiple layers of fabric. Belts with two layers of fabric can have laps that are stacked on top of one another. A typical prior art banded V-belt construction is shown in FIG. 7 of the drawings in which inner band 11 is lapped at the top surface of the belt at 15, and outer band 13 is lapped at the top surface of the belt at 17, forming stacked laps. These laps create a thickness variation in the core of the belt that cause the layer of tensile members 19 to become distorted from its normal horizontal orientation.

Because the tensile cord of the load-carrying section is responsible for transmitting power in the belt, a distortion in the cord line results in uneven distribution in the tensile member. This uneven loading decreases the belt's ability to transmit power when compared to a belt that has uniformly loaded cord. Furthermore, the prior art belt, which may have a lap located on the upper most or lower most surface of the belt, exhibits increased bending resistance. Such an increase in bending resistance, particularly in drives utilizing relatively small diameter sheaves, results in reduced belt life.

There is a need for a banded V-belt construction that provides optimal frictional properties for the driving surfaces of the belt, offers maximum protection to the embedded tensile cords while minimizing the use of fabric material to limit bending resistance, and avoid the use of laps that would otherwise lead to distortion in the cordline and uneven load distribution in the tensile member.

SUMMARY OF THE INVENTION

The invention in one aspect is directed to a single strand banded power transmitting V-belt, including a generally trapezoidal shaped body formed of rubber, including a compression section, a tension section, and a load-carrying section. The belt body has top, bottom and side surfaces, the side surfaces being inclined and convergent toward one another, and the load-carrying section extends substantially parallel to at least one of the top and bottom surfaces and intercepts the side surfaces intermediate the top and bottom surfaces. At least one ply of a band fabric is provided which traverses the bottom surface and each of the side surfaces of the belt body so as to cover the load-carrying section at the position that it intercepts the side surfaces of the belt body. The ply of band fabric does not overlap with itself.

In another aspect, the invention is directed to a single strand banded power transmitting V-belt including a generally trapezoidal shaped belt body formed of rubber, including a compression section, a tension section, and a load-carrying section. The belt body has top, bottom and side surfaces, the side surfaces being inclined and converging toward one another, and the load-carrying section extends substantially parallel to at least one of the top and bottom surfaces and intercepts the side surfaces intermediate the top and bottom surfaces. The belt body also has a first ply of a band fabric of general inverted U-shape which traverses and is bonded to the top surface and each of the side surfaces of the belt body and extends down the side surfaces so as to cover the load-carrying section at the position that it intercepts the side surfaces of the belt body. The first ply of band fabric does not overlap with itself. The belt body has a second ply of a band fabric of general U-shape which traverses and is bonded to the bottom surface and each of the side surfaces of the belt body and extends up the side surfaces so as to cover the load-carrying section at the position that it intercepts the side surfaces of the belt body, and wherein the second ply of band fabric overlaps the first ply along the side surfaces but does not overlap with itself.

BRIEF DESCRIPTION OF THE DRAWINGS

Preferred aspects of this invention will be described with reference to the accompanying drawings, in which like numerals designate like parts in the several figures, and wherein.

DESCRIPTION OF PREFERRED EMBODIMENT

Figure 1:
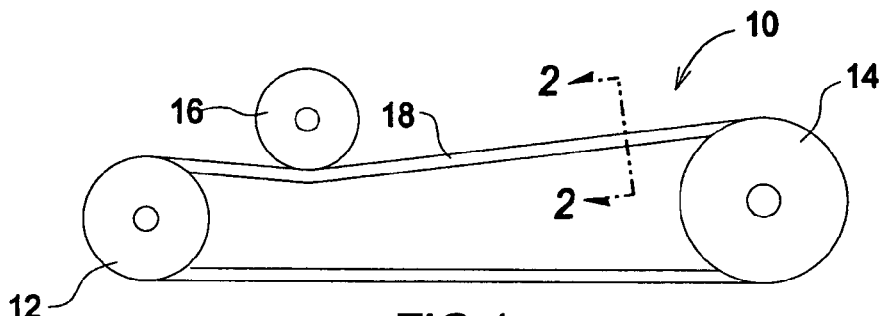
FIG. 1 is a simplified V-belt drive.
Figure 2:
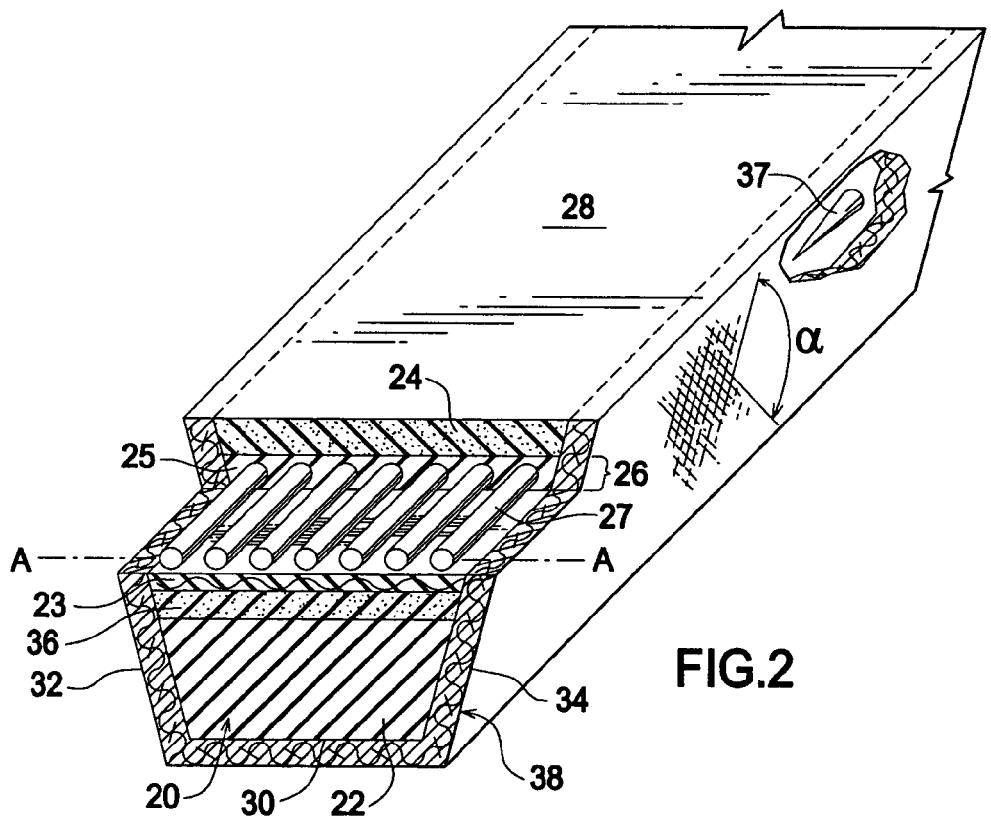
FIG. 2 is a perspective, partial sectional view of the V-belt of the drive of FIG. 1 taken along section 2-2.

Referring first to FIGS. 1 and 2, a typical power transmission drive system 10 is shown comprising a drive sheave 12, a driven sheave 14, a V-belt 18 trained thereabout and wedged therein in driving relation, and a flat faced idler pulley 16 which engages the top or wide side of the belt to maintain tension on the belt and remove the slack between the sheaves.

The power transmission belt 18 is of the V-type, having a generally trapezoidal shaped belt body 20 formed of rubber or rubber-like material, and includes a compression section 22, a tension section 24, and a load-carrying section 26. Although the V-belt of the invention may be used for various applications including for automotive and industrial transmission of power between complimentary shaped sheaves or pulleys, the banded V-belt of the invention is particularly adapted for industrial application. Standard single strand industrial V-belt cross sections applicable for the belt of the invention include industry standard sizes A, B, C, and D, 2L, 3L and 4L and 3V, 5V, 8V and metric sizes SPZ, SPA, SPB and SPC. These belts can have standard trapezoidal shapes with generally parallel top 28 and bottom 30 surfaces, and respective side surfaces 32, 34 which are inclined and converge toward one another as shown in FIG. 2. Alternatively, side surfaces 32, 34 may be somewhat concave, and top and bottom surfaces 28, 30 may be crowned or assume other conventional shape.

Belt body 20 is formed of rubber, and by "rubber" is meant a cross-linkable natural or synthetic elastomer which is processable in solid form e.g. on a mixing mill. Such rubber is typically mixed in a green or unvulcanized form, with appropriate additives, extenders, reinforcements, accelerators, fillers, vulcanizing agents, e.g. sulfur or peroxides, and the like in a suitable batch or continuous mixer, well known in the rubber processing industry. Typical synthetic rubbers useful in the invention include polychloroprene, copolymers of ethylene and propylene, terpolymers of ethylene, propylene and diene monomers, e.g. EPDM, styrene butadiene rubber, HNBR, CSM, silicone rubber, fluroelastomers, mixtures of the foregoing, and alloys or mixtures of the foregoing or other known solid processable rubbers mixed with suitable thermoplastic or thermosetting polymers or "plastomers", polyethylene, polyester (Hytrel—registered trademark of DuPont) or materials such as Santoprene—registered trademark of Advanced Elastomer Systems, LP. Liquid processable elastomeric materials such as those formed by liquid casting, applicable to many forms of polyurethane, are not within this definition and are not contemplated by the invention.

Any of the various layers of the compression section 22, tensile section 24, and gum stock layer 25 sandwiching, and in which is embedded the spirally wound tensile members 27 of load-carrying section 26, may be formed of any of the aforementioned rubber materials, which are typically plied up on a building drum as layers or calendared sheets of stock with or without textile reinforcement therein. The core or belt body of the V-belt of FIG. 2 may include fiber loaded rubber stock such as a composite of cotton and polyester fiber or any other suitable fiber such as aramid, and may be positioned in one or both of the compression and tensile sections. In the case of the belt of FIG. 2, both the outer most tensile section layer 24 and layer 36 of the compression layer are suitably loaded with fiber reinforcement.

The load-carrying section 26, positioned more or less at the neutral axis of the belt, is preferably formed of single unit cord tensile members 27 which have been spirally wound over underlying rubber layers of the belt as it is being plied up on a drum, sandwiched between adhesion gum layers 25 of suitable type. In a preferred embodiment the rubber utilized in the belt is polychloroprene, and is used in all portions of the compression, tension and load-carrying gum sections. Alternatively, particularly for extra long length belts, the load-carrying section may be formed of multi-unit cord, such as calendared sheets of tire cord (load-carrying warp cord held together in a fabric form by spaced pick weft cords), and wrapped around the drum multiple times to form a number of layers constituting the load-carrying section.

Whether the load-carrying section is formed of single unit tensile cord or multi-unit cord, the load-carrying section extends substantially parallel to at least one of the top or bottom surfaces of the belt and intercepts the side surface of the belt as an "edge cord" shown at 37.

Preferably a cord support layer 23 is positioned just beneath the load-carrying section 26. The cord support layer 23 may be comprised of one or more calendared sheets of tire cord, with the heavier warp cords extending transversely to the tensile cord 27 to provide lateral support.

Figure 7:
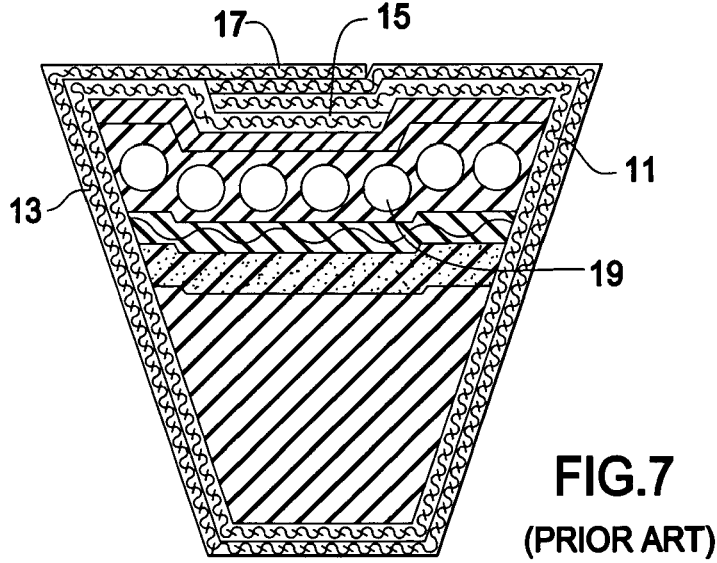
FIG. 7 is an elevational sectional view of a prior art V-belt.

In accordance with the intention, the belt body 20, along with such edge cord 37 is covered by a band ply fabric 38 which traverses and is bonded to the bottom surface 30 and each of the side surfaces 32, 34 of the belt body so as to cover the load-carrying section at the position 37 that it intercepts the side surfaces of the belt body. It is preferred that band fabric 38, as shown, covers solely the side walls 32, 34 of the belt, extending above the cord line shown at A-A, and preferably to the top corners of the belt. However, it is permissible for the band fabric layer 38 to traverse and cover a portion of top surface 28 so long as fabric layer 38 does not overlap with itself (as with the prior art belt of FIG. 7, with overlaps 15 and/or 17).

Band ply 38 is formed of a "fabric", that is, a planar textile structure produced by interlacing yarns, fibers, or filaments. The fabric may be a woven fabric, such as a square woven fabric, twill, knit, braid, or a non-woven such as a felt or needlepunched fleece. For many industrial applications it is preferred to use a woven fabric in which the angle between the warp and weft yarns exceeds the normal 90 degrees included angle, and is preferably in the range of from about 95° to about 125° with the most preferred angle being from about 100 to about 120°, as applied to the belt at angle $\alpha$. This included angle is utilized for the band ply 38 covering the side surfaces of the belt of FIG. 2, and is also used as the top band ply fabric 39 utilized in the embodiment of FIG. 3. The use of a band ply fabric with an included angle between the warp and weft in the range of 120° (prior to application to the belt, and pantographing) is discussed more fully in Assignee's U.S. Pat. No. 2,519,590 to Mitchell.

Band ply 38 will typically be rubberized on at least the inner side facing the belt body, for adhesion thereto. The exterior surface may be left bare, for clutching applications, or also rubberized as desired.

It is sufficient if only a single band ply (ply 38 of FIG. 2) covers and extends past cordlines A-A. For instance, the band configuration of FIG. 2 can be used and, in addition, an inverted U-shaped band can be used that traverses top surface 28 of the belt and wraps around the sides of tension section 24, either inside or outside band ply 38, without covering or extending down to cordline A-A.

Figure 3:
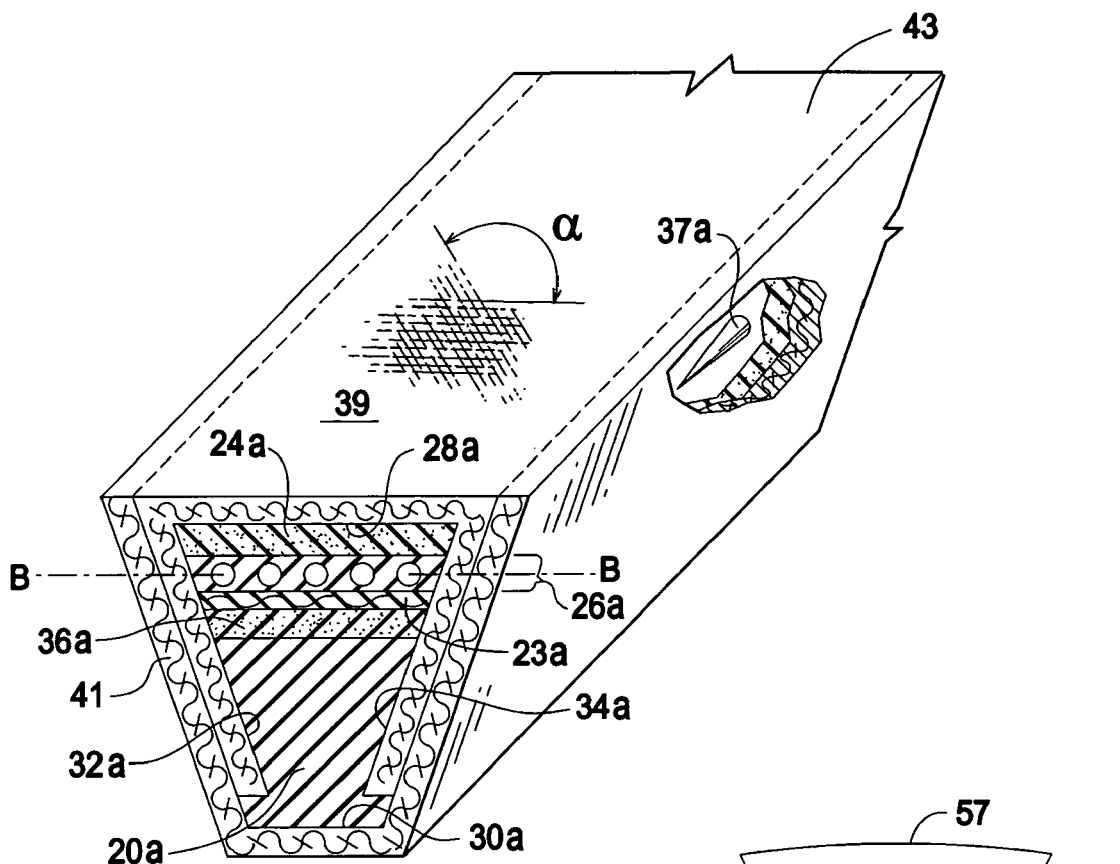
FIG. 3 illustrates an alternative embodiment of the invention in perspective and partial section.

The V-belt of FIG. 3 is similar to the belt of FIG. 2 except that it uses a narrower, taller profile cross section, and employs multiple (two) plies of band fabric to cover the exterior surface of the belt. The construction of the core body 20a of the belt of FIG. 3 may be substantially the same as the construction of FIG. 2. The design and construction will be dictated by the particular application earmarked for the belt.

Two plies of band fabric, first ply 39 and second ply 41 are utilized in the belt of FIG. 3. The first or inner band ply 39 is of general inverted U-shape and traverses and is bonded to the top surface 28a of the core belt body as well as being bonded to side surfaces 32a and 34a of the belt. Fabric layer 39 extends down along sidewalls 32a and 34a at least past cordline B-B, and preferably extends substantially to the bottom corners of the belt, as shown. In this manner the load carrying section 26a of the belt, where it intercepts the side surfaces of the belt body such as at 37a, will be fully covered by inner band ply 39. Band ply 39 is preferably rubberized, such as by frictioning or skimming with suitable rubber as in a calendaring operation, so that it bonds and can be vulcanized to rubber core 20a. Preferably band ply 39 also bears a friction or skim coat on its exterior surface that forms the finished top surface 43 of the belt, which provides it with a high enough coefficient of friction to engage a device impinging on its backside, such as a flat faced pulley or tensioner 16 shown in FIG. 1. However, in other applications where a less aggressive surface is required on the back of the belt, or clutching is required, the outer surface of band ply 39 may simply be the bare fabric itself, with or without a suitable coating.

A second ply of band fabric 41 of general U-shape traverses and is bonded to the bottom surface 30a of the belt body and extends up side surfaces 32a, 34a of the belt so as to cover the load-carrying section at the position B-B where it intercepts the side surfaces of the belt body at 37a. As with the case of first band ply 39, outer band ply 41 does not extend around the full perimeter of the belt body and overlap upon itself. Outer band ply fabric 41, as with inner ply 39, is preferably rubberized on its inner surface so as to bond to inner band ply 39. Advantageously, the outer surface of second band ply 41 is free of any coating of rubber, and is preferably "bare" other than carrying suitable fabric treatment. In this fashion, the frictional properties of the sheave engaging side surfaces represented by the second band ply fabric 41 may be customized to allow for some slippage relative to the sheaves 12, 14 in which the belt engages, such as for a clutching or shock loaded drive. Alternatively band ply 41 may be rubberized on both its inner and outer surfaces.

By rubberizing inner band ply 39 on both surfaces to achieve the backside frictional properties useful for many industrial belts, and by using a bareback construction for outer ply 41 for clutching or similar applications, the belt may also be provided in a distinctive contrasting two-tone color, with the back of the belt 43 being black, and the sides an bottom of the belt utilizing another color, distinctive from black for a pleasing two-tone color combination.

Figure 4:
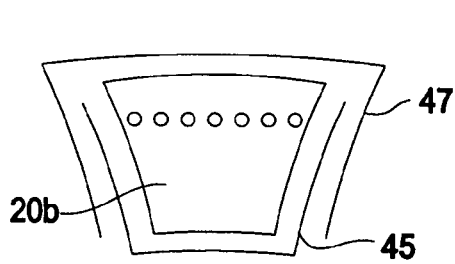
FIG. 4 is a schematic of an alternative band or cover configuration of the invention.
Figure 5:
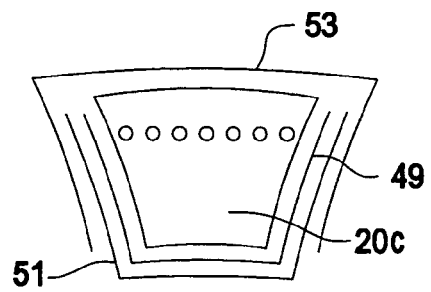
FIG. 5 is a further alternative band construction in accordance with the invention.
Figure 6:
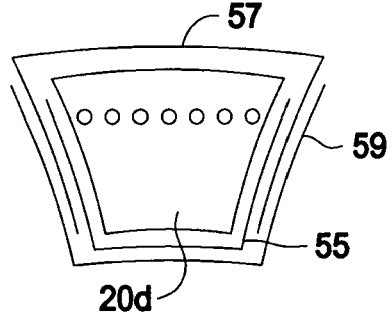
FIG. 6 is still a further alternative band construction in accordance with the invention.

Other band fabric configurations are within the scope of the invention. FIGS. 4-6 depict examples of such alternative configurations. In FIG. 4 two plies of band fabric 45, 47 are covering belt body 20b, which may be similar in construction and configuration to belt body 20 or 20a in FIGS. 2 ad 3 respectively. In FIG. 4, the first ply of band fabric is of a general U-shape bonded to belt body 20b, and the second, outer ply 47 is positioned over first ply 45, overlapping with it on the side faces of the belt. This configuration is basically the reverse of that shown in FIG. 3.

In FIG. 5 a three ply cover configuration is shown in which the first two plies 49,51 are generally U-shaped and traverse and are bonded to the bottom and side surfaces of belt body 20c, and third ply 53 is a generally inverted U-shaped band which covers the top and overlaps the upwardly extended portions of the first and second plies, overlapping therewith along the side surfaces of the belt.

A further three ply band fabric cover configuration is shown in FIG. 6. This is similar to FIG. 5 except that the first ply 55 of generally U-shaped configuration traverses and is bonded to the bottom and side surfaces of belt body 20d. The second ply 57 is of a general inverted U-shape, overlapping with ply 55 along the side surfaces of the belt, and the third and final ply 59 is of general U-shape which overlaps with and is bonded to at least second ply 57 along the side surfaces of belt body 20d.

All of such configurations exemplified by those shown in FIGS. 4-6 have at least one ply which extends adjacent to or beyond the load-carrying section at the position where it intercepts with the side surfaces of the belt body. In that manner, at least one of the fabric band layer covers the edge cords similar to edge cords 37, 37a depicted in FIGS. 2 and 3. Furthermore, the various band ply layers in FIGS. 4-6 can be tailored to provide the desired frictional and flexing properties for the belt, and to provide adequate bonding between the various layers. As with the prior embodiments, these changes can be effected by the treatment of the fabric through the use of appropriate coatings, and whether or not the fabric has been impregnated with rubber by calendaring or the like. One skilled in the art will appreciate that various other band ply configurations in addition to those shown in FIGS. 2-6 can be envisioned which utilize the principals of the invention whereby overlaps are avoided at the top and bottom surfaces of the belt, and a sufficient number of band plies are positioned against the sidewall of the belt, where they overlap, to provide adequate wear resistance and protection against the environment. The aforementioned is achieved with a minimum number of such plies being positioned along the top and bottom surfaces of the belt so that bending resistance is reduced. The total sum of the number of plies of band fabric positioned on both side surfaces of the belt body exceed the total sum of the number of plies of band fabric positioned on the top plus bottom and surfaces of the belt body. Reduced bending resistance also translates to an enhanced ability for the belt drive to accommodate some misalignment between juxtaposed sheaves 12, 14 shown in FIG. 1.

The belt of the invention according to its various embodiments may be manufactured using known methods, which do not form a part of this invention and will be understood by those skilled in the art. In one such method the belt is built up on a drum in inverted fashion. Thus, in respect to the belt of FIG. 2, the layer of overcord 24 in a calendared sheet of desired dimension is plied up on the building drum, followed by the layer of adhesion gum 25. The single unit tensile cords 27 are then spirally applied to the exterior of the adhesion gum layer from a let-off device, at the appropriate spacing and tension. Another ply of adhesion gum is then added after the cord. Upon the layer of adhesion gum over the tensile cord is then applied cross cord calendared sheet 23, which can be made up of a series of sheets that are adhered to one another in lapped form on a suitable Banner Table™ ("Banner®" is a registered trademark of Burrows Manufacturing Ltd.) To this layer is then applied by wrapping the fiber loaded calendared layer 36, and finally upon that layer is plied up the compression rubber layer 22. The fully built up sleeve is then profiled with a knife or other cutting device to produce individual green (unvulcanized) belt bodies, to which is applied on three sides only (bottom and sides) the ply of band fabric 38. The band ply 38 may be frictioned with rubber on both sides thereof in a calendar, or where a bareback construction is desired, skimmed with rubber on the inner side thereof to be positioned adjacent the belt body 20, and left bare on the outer surface thereof, which will engage the sides of the drive and driven sheaves. The individual unvulcanized belt strands may then be conventionally vulcanized under elevated temperature and pressure, as in a steam autoclave, to achieve a fully integrated vulcanized belt ready for use.

The actual curing device used to achieve vulcanization may typically be a well-known ring mold, wherein the individual unvulcanized belt strands are positioned in individual cavities defined by metal mold and ring members, an example of which is disclosed in U.S. Pat. No. 4,095,480 to Schwabauer. Alternatively, particularly for extra long length belts, the well known step curing process may be used, such as disclosed in U.S. Pat. No. 4,332,576 to Stecklein and Daugherty.

The following working examples provide further detail in respect to the preferred embodiment of the invention, and demonstrate the advantages that are attributable to belts made in accordance with the invention.

EXAMPLE I

V-belts of the invention substantially conforming to the embodiment of FIG. 3 of the drawings, and comparative belts made identically except for the band ply construction, were constructed as follows. Onto a building drum was first applied a 0.030 inch (0.76 mm) thick calendared fiber loaded stock 24a composed of polychloroprene rubber to which was added virgin cotton fibers of 1 mm length and very fine diameter, in the ratio of 1 part by weight of cotton fiber to 5 parts by weight polychloroprene polymer. In addition, polyester fibers of 3-5 mm length were also mixed with the polychloroprene rubber in the ratio of 1 part by weight polyester fiber to 10 parts by weight of polychloroprene polymer. Onto the fiber loaded stock layer is then applied a sheet of polychloroprene adhesion gum of 0.017 inch (0.43 mm) thickness and on top of that was spiraled single unit tensile cords 27. The tensile cords were formed of aramid fibers having a gauge thickness of 0.055 inch (1.40 mm), and had three sequential coatings applied to the surface of the cord, as follows: the first treatment was with a primer of standard construction; the second treatment was a resorcinol formaldehyde latex (RFL) coating on top of the primer; and the third and last treatment layer was a liquid polychloroprene cement disbursed in a solvent, applied by dipping. The cord was type 2500-1/5, that is, consisting of 2500 dtex, composed of individual yarns which are "Z" twisted at 4 twists/inch (0.16 twists/mm) and then five of those twisted yarns were formed into the cord by twisting them in the "S" direction at 2 twists/inch (0.08 twists/mm). Another ply of adhesion gum of 0.017 inch (0.43 mm) thickness was then added after the cord. Onto the adhesion gum was applied a 0.030 inch (0.76 mm) cross cord fabric known as "tire cord", with the primary cord, which extended generally perpendicular to the tensile cord 27, having a thickness of 0.024 inch (0.61 mm). This cross cord fabric was treated with RFL, and the multi-unit nylon tire cord 23a possessed 36 of the primary cord ends per inch (1.42 cord ends per mm). The next layer 36a, which was applied on top of the cross cord, was a fiber loaded stock the same as layer 24a, followed lastly by a polychloroprene gum stock of 0.042 inch (1.07 mm) thickness.

The aforementioned carcass of plied up unvulcanized components was then profiled into individual belt bodies 20a, and each such belt body was then inverted or flipped and the band plies applied to the exterior of the belt body as follows. First band ply 39 consisted of a 0.021 inch (0.53 mm) thick fabric which was RFL treated, and then frictioned on both sides with polychloroprene rubber. The fabric was a treated cotton-nylon woven fabric having an initial woven bias angle between the warp and weft fibers of 120°, and a finished bias angle α as applied to the belt of 105°. The fabric itself was composed of a blend of 75% cotton/25% nylon. This band ply 39 was applied in generally inverted U-shape with the band ply covering the top surface 28 of the belt body 20a and extending down the sides 32a and 34a of the belt substantially to the bottom corners of the belt body, but not extending around the corners and onto the bottom of the belt body 30a.

The second ply of band fabric 41 was formed of the same fabric material as the fabric used for ply 39, with the exception that the RFL treated fabric rather than being frictioned on both sides was skimmed solely on the inner surface, and no rubber was applied to the exterior of layer 41 so that it was a bare treated fabric with no impregnation of rubber in its interstices. This second ply of band fabric 41 was applied in a generally U-shape as shown in FIG. 3., covering the bottom 30a of the belt body and extending up the side surfaces of the belt substantially to the top corners of the belt, but not extending to top surface 43, nor overlapping on itself.

The thus formed individual unvulcanized single strand belts were then vulcanized in a standard ring mold under pressure and at a temperature of about 170° C. for about 15 minutes to fully integrate and vulcanize the same into finished 5V cross section industrial belts for testing. The aforegoing ring cured belts made in accordance with the invention are designated as Belts A.

A second set of belts identical with those described above were vulcanized using a standard step cure vulcanization apparatus, rather than ring cure. These belts made in accordance with the invention are designated as Belts B.

The comparative belts were made using the same materials and steps of construction and vulcanization as for the belts of the invention as described above, with the following exception. Two band plies of fabric were applied, the first or inner ply corresponding to the inner ply 39 of the belt of the invention of FIG. 3 was applied so that it also traversed the bottom surface 30a of the belt body 20a and overlapped on itself there, forming a seam at the bottom of the belt. Similarly, the outer ply of band fabric corresponding to fabric 41 of the invention of FIG. 3 was wrapped around the first ply band fabric and fully overlapped on itself in the middle of the top surface 43, so that the finished belt had one overlap at the bottom of the belt and one overlap at the top of the belt. The belts were ring mold cured. These belts are designated as Comparative Belts.

Two each of finished Belts A, Belts B and Comparative Belts were tested by assembling on a drive similar to that shown in FIG. 1 using two equal diameter sheaves 12,14 of 4.41 inch (112 mm) diameter, which is subminimal diameter for 5V section industrial belts. The belts themselves have a length of 70.5 inches (1791 mm). The sheaves were rotated at 1750 rpm, with a 10 horsepower (HP) load at a 4:1 tension ratio.

Table 1 provides the average life of the tested belts, in hours. End of life of the belt corresponded to the time at which the belt broke. As can be seen from Table 1, the belt of the invention as depicted in FIG. 3, Belt A, which was vulcanized using a ring mold cure process, had approximately a 40% greater life than the Comparative Belt that was fully banded. The step cured Belt B of the invention also had a life that exceeded the ring mold cured Comparative Belt (one normally expects a ring mold cured belt to have an equal to or greater life than a corresponding belt vulcanized by a step cure process).

TABLE 1

| BELT | LIFE, Hours |
|---|---|
| A | 168.7 |
| B | 127.2 |
| Comparative | 120.0 |

EXAMPLE II

In this test, Belts A and Comparative Belts made exactly as in Example I were subjected to the following test to determine toleration of misalignment of the drive and driven sheaves 12, 14. In this test the 70.5 inch (1791 mm) long 5V section belts were run on two equal diameter sheaves of nominal 7.1 inch (180 mm) diameter rotating at 1750 rpm, with a 30 HP load at 4:1 tension ratio. The two sheaves were purposely misaligned by 3°. The results of the tests are provided in Table 2 which showed that Belt A of the invention ran approximately 22% longer than the fully banded Comparative Belt.

TABLE 2

| BELT | LIFE, Hours |
|---|---|
| A | 211.8 |
| Comparative | 172.7 |

Although the present invention has been described in detail in the foregoing for the purpose of illustration, it is to be understood that such detail is solely for that purpose and that variations can be made therein by one skilled in the art without departing from the spirit or scope of the present invention except as it may be limited by the claims. The invention illustratively disclosed herein may be suitably practiced in the absence of any element which is not specifically disclosed herein.

What is claimed is:

1. A single strand banded power transmitting V-belt, comprising:
  (a) a generally trapezoidal shaped belt body formed of rubber, including a compression section, a tension section, and a load-carrying section;
  (b) said belt body having top, bottom and side surfaces, the side surfaces being inclined and converging toward one another, and the load-carrying section extending substantially parallel to at least one of the top and bottom surfaces and intercepting the side surfaces intermediate the top and bottom surfaces;
  (c) at least one ply of a band fabric which traverses and is bonded to the bottom surface and each of the side surfaces of the belt body so as to cover the load-carrying section at the position that it intercepts the side surfaces of the belt body; and
  (d) at least one other ply of band fabric of general inverted U-shape traverses and is bonded to the top surface of the belt, and extends down and overlaps the one ply of band fabric on each of the side surfaces of the belt at a point to or below where the load carrying section intercepts the side surfaces, and wherein neither said one ply nor said other ply of band fabric overlaps with itself.

2. The V-belt of claim 1 wherein the band fabric is a woven fabric of warp and weft yarns, the included angle between the warp and weft yarns being from about 95 to about 125 degrees.

3. The V-belt of claim 1 wherein the band fabric on the exterior of the side surfaces of the belt is free from substantial impregnation with rubber.

4. The V-belt of claim 3 wherein the band fabric is treated with a coating of resorcinol formaldehyde latex adhesion promoter.

5. The V-belt of claim 1 wherein in addition to the one ply and the other ply of band fabric, there is provided at least one further ply of band fabric wrapped about at least a portion of the one ply and the other ply of band fabric so that all overlaps of band fabric producing one or more seams are located adjacent the side surfaces of the belt.

6. The V-belt of claim 1 wherein the load-carrying section is formed of spirally extending single unit tensile cords, beneath which are positioned cord fabric in which the cords of the cord fabric extend generally transversely to the tensile cords.

7. The V-belt according to claim 1 wherein the load-carrying section is formed of spirally extending single unit tensile cords, beneath which are positioned cord fabric in which the cords of the cord fabric extend generally perpendicular to the tensile cords.

8. A single strand banded power transmitting V-belt, comprising:
  (a) a generally trapezoidal shaped belt body formed of rubber, including a compression section, a tension section, and a load-carrying section;
  (b) said belt body having top, bottom and side surfaces, the side surfaces being inclined and converging toward one another, and the load-carrying section extending substantially parallel to at least one of the top and bottom surfaces and intercepting the side surfaces intermediate the top and bottom surfaces; and
  (c) a first ply of a band fabric of general inverted U-shape which traverses and is bonded to the top surface and each of the side surfaces of the belt body and extending down the side surfaces so as to cover the load-carrying section at the position that it intercepts the side surfaces of the belt body, and wherein the first ply of band fabric does not overlap with itself; and
  (d) a second ply of band fabric which traverses and is bonded to the bottom surface of the belt body, extending up each of the side surfaces of the belt body to a point to or above where the load carrying section intercepts the side surfaces of the belt body, and overlapping the first ply of band fabric on each of the side surfaces of the belt, and wherein the second ply of band fabric does not overlap with itself.

9. The V-belt of claim 8 wherein the first ply of band fabric is rubberized on both sides thereof so that the top surface of the belt body carries a layer of rubber thereon.

10. The V-belt of claim 9 wherein the second ply of band fabric forms the exterior of the side surfaces of the belt and such side surfaces are free from substantial impregnation with rubber.

11. The V-belt of claim 8 wherein the first ply of band fabric is a woven fabric of warp and weft yarns, the included angle between the warp and weft yarns being from about 100 to about 120 degrees.

12. The V-belt of claim 11 wherein the second ply of band fabric is a woven fabric of warp and weft yarns, the included angle between the warp and weft yarns being from about 100 to about 120 degrees.

13. The V-belt of claim 8 wherein in addition to the first and second plies of band fabric there is provided at least one further ply of band fabric wrapped around at least a portion the first and second plies of band fabric so that all overlaps of band fabric producing one or more seams are located adjacent the side surfaces of the belt.

14. The V-belt of claim 8 wherein the load-carrying section is formed of spirally extending single unit tensile cords, beneath which are positioned cord fabric in which the cords of the cord fabric extend generally transversely to the tensile cords.

15. The V-belt according to claim 8 wherein the load-carrying section is formed of spirally extending single unit tensile cords, beneath which are positioned cord fabric in which the cords of the cord fabric extend generally perpendicular to the tensile cords.

16. A single strand banded power transmitting V-belt, comprising:
  (a) a generally trapezoidal shaped belt body formed of rubber, including a compression section, a tension section, and a load-carrying section;
  (b) said belt body having top, bottom and side surfaces, the side surfaces being inclined and converging toward one another, and the load-carrying section extending substantially parallel to at least one of the top and bottom surfaces and intercepting the side surfaces intermediate the top and bottom surfaces;
  (c) at least one ply of a band fabric which traverses the bottom surface and each of the side surfaces of the belt body so as to cover the load-carrying section at the position that it intercepts the side surfaces of the belt body, and wherein the ply of band fabric does not overlap with itself;
  (d) at least one other ply of band fabric which traverses and is bonded to the top surface and each of the side surfaces so as to cover the load-carrying section at the position that it intercepts the side surfaces of the belt body, and wherein the other ply of band fabric does not overlap with itself; and (e) the total sum of the number of plies of band fabric positioned on both side surfaces of the belt body exceed the total sum of the number of plies of band fabric positioned on the top plus bottom and surfaces of the belt body.

17. The V-belt of claim 16 wherein two plies of band fabric are positioned and overlap on the side surfaces of the belt body, and one ply of band fabric is positioned on each of the top and bottom surfaces of the belt body.

18. A V-belt drive comprising a drive sheave, a driven sheave, and the V-belt of claim 16 trained about the drive and driven sheaves in driving relation.

* * * * *